United States Patent [19]

Hill

[11] 4,039,624

[45] Aug. 2, 1977

[54] METHOD OF PRODUCING PHOSPHORIC ACID FROM HIGH IRON AND ALUMINUM CONTENT PHOSPHATE ROCKS USING NITRIC ACID

[75] Inventor: Robert Oliver Hill, Johannesburg, South Africa

[73] Assignee: National Process Industries (Proprietary) Limited, Johannesburg, South Africa

[21] Appl. No.: 596,777

[22] Filed: July 17, 1975

[30] Foreign Application Priority Data

July 30, 1974 South Africa ............... 74/4842
Jan. 9, 1975 South Africa ............... 75/0162

[51] Int. Cl.² ........................................... C01B 25/16
[52] U.S. Cl. .............................. 423/319; 423/321 R; 423/167
[58] Field of Search ............... 423/319, 395, 321, 167

[56] References Cited

U.S. PATENT DOCUMENTS

| 1,816,285 | 7/1931 | Johnson | 423/319 |
| 1,976,283 | 10/1934 | Johnson | 423/395 |
| 2,114,600 | 4/1938 | Larsson | 423/319 |
| 2,252,280 | 8/1941 | Balz et al. | 423/319 |
| 3,472,616 | 10/1969 | Hauge | 423/167 |
| 3,919,395 | 10/1975 | Hauge | 423/319 |

FOREIGN PATENT DOCUMENTS 484,037 4/1938 United Kingdom ............... 423/319

Primary Examiner—O. R. Vertiz
Assistant Examiner—Eugene T. Wheelock
Attorney, Agent, or Firm—Ladas, Parry, von Gehr, Goldsmith & Deschamps

[57] ABSTRACT

This invention concerns the solubilization of phosphate values in phosphate bearing rock which contains high contents of aluminium and/or iron by attacking the phosphate rock with a nitric acid leach solution for a time suitable to produce a phosphate rich leach solution containing no more than 10 parts Fe and Al in solution calculated as $R_2O_3$ per 100 parts of $P_2O_5$ in solution.

5 Claims, 1 Drawing Figure

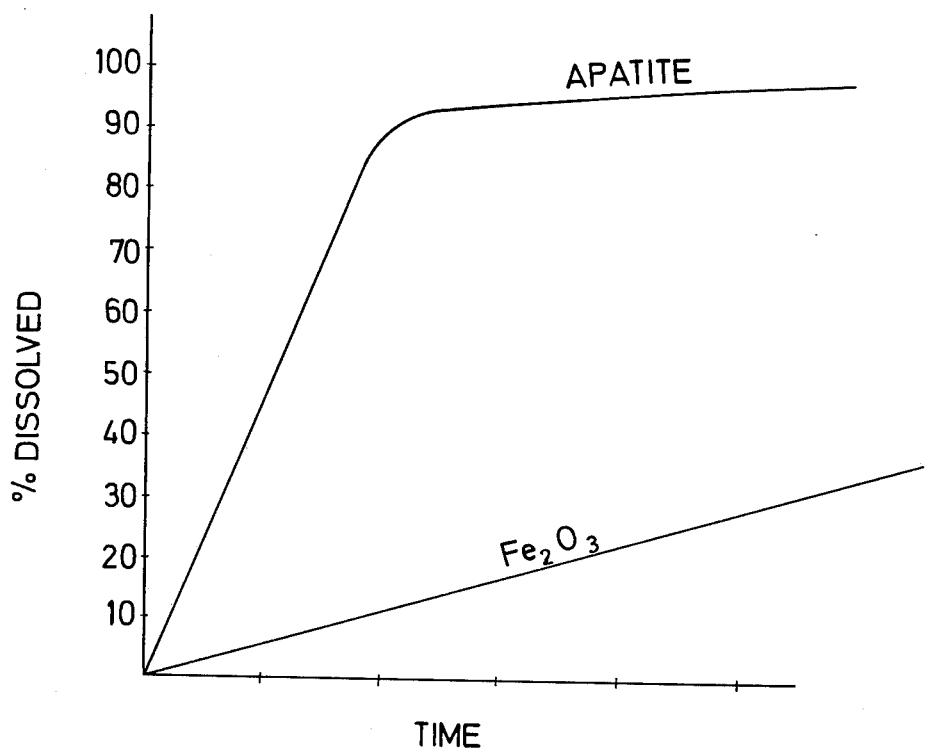

METHOD OF PRODUCING PHOSPHORIC ACID FROM HIGH IRON AND ALUMINUM CONTENT PHOSPHATE ROCKS USING NITRIC ACID

This invention is concerned with improvements in and relating to the recovery of phosphate values from phosphate rock minerals consisting substantially of calcium phosphate and having high contents of Fe and/or Al.

The treatment of phosphate rock to recover the phosphate values therefrom or to render them more water-soluble is a very well-known and established art. Thus, for example, the treatment of phosphate rock with sulphuric acid to produce the so-called "superphosphate" has long been practised in the fertiliser manufacturing industry. Similarly it has long been known to treat phosphate rock with sulphuric acid to produce phosphoric acid by the so-called "wet-process". Similarly, the treatment of phosphate rock with nitric acid to produce water-soluble phosphate-containing materials is also well known. In this latter case it has been the practice to utilise the phosphate rock/nitric acid reaction mixture, for example after removal of some or all of the calcium nitrate formed and addition of ammonia, to yield a nitrogen- and phosphate-containing fertiliser.

One of the principal drawbacks of the acid treatment processes described above for solubilising phosphate values in phosphate rock is that they are not applicable to phosphate rocks containing appreciable amounts of impurities such as aluminium or iron compounds, especially rocks containing more than about 3% by weight of the metals calculated as $R_2O_3$. In the case of superphosphate manufacture using rocks high in aluminium and iron the product obtained is a toffee-like material which is difficult to handle as compared with the normal, easily-broken-up superphosphate. In the case of phosphoric acid manufactured by the wet process the iron and aluminium go into the acid produced and there lead to problems in gypsum crystallisation and filtration and also cause the precipitation of considerable amounts of water-insoluble phosphate when the acid liquor is reacted with ammonia during the treatment of the liquor to give an NP or NPK fertiliser. Similarly, when such a phosphate rock is treated with nitric acid the second of these problems again arises when the phosphoric acid rich liquor is reacted with ammonia to produce an NP or NPK fertiliser. These drawbacks of the conventional acid treatment processes were avoided by employing only phosphate rocks which do not contain substantial amounts of iron and aluminium compounds. However, pressure on world phosphate rock resources has grown to an extent such that it would be desirable, if possible, to treat rocks of high iron/aluminium content, of which there are very large deposits throughout the world or which arise as by-products from certain mining or beneficiation operations.

According to this invention, there is provided a method of solubilising phosphate values in a phosphate rock which contains iron and/or aluminium in the form of one or more of the oxides $Fe_2O_3$, $Fe_3O_4$ and $Al_2O_3$ and in an amount of greater than 3 percent by weight calculated as $R_2O_3$, including the step of attacking the rock with a nitric acid leach solution for a time suitable to produce a phosphate rich leach solution containing no more than 10 parts by weight of Fe and Al in solution calculated as $R_2O_3$ per 100 parts by weight $P_2O_5$ in solution. The phosphate in the material will generally be in the form of apatite $Ca_{10}(PO_4)_6X$ wherein X can be $F_2$, $(OH)_2$, or $CO_3$, particularly fluoroapatite. The process of the invention will be applicable to rocks containing at least 3% Al and/or Fe, calculated as $R_2O_3$. However, the process has particular application to rocks containing much higher quantities of iron and aluminium. For example, the process has particular utility when the $R_2O_3$ content is in the range 5 to 25 percent by weight.

In operation of the process of the invention the aluminium and/or iron are in such form that they are only slowly solubilised by the attacking leach solution which will rapidly also contain phosphoric acid and hydrofluoric acid, if the phosphate values are in the form of fluoroapatite) and much more slowly solubilised than are the phosphate values. The invention utilises this differential rate of dissolution. The accompanying drawing represents graphically the differential rates of dissolution of apatite and $Fe_2O_3$ in nitric acid, particularly in nitric acid having a concentration of 53 to 65 percent by weight. The corresponding graphs for $Fe_3O_4$ and $Al_2O_3$ occupy similar positions relative to the graph for apatite. The units of time have not been specified as these will depend on factors such as concentration of acid, temperature of attack, and particle size.

In order to maximise the efficiency of $P_2O_5$ utilisation, the attack is continued until the leach solution contains 90 to 100 percent by weight of the original $P_2O_5$ in the rock; with the proviso that it is stopped whilst the aluminium and iron in solution is as low as possible and, in any event, no greater than 10 parts, preferably no greater than 5 parts, Fe and Al calculated as $R_2O_3$ per 100 parts by weight $P_2O_5$ in solution. In general, nitric acid leach solutions used will contain 20 to 75, preferably 53 to 65, percent by weight nitric acid. With such attacking acids the attack is generally maintained for periods of up to two hours to achieve the desired result. The rates of dissolution of apatite, iron oxides and aluminium oxide are all temperature dependent so the higher the temperature the shorter the attack time. The temperature will in general be maintained between 40 and 75° C during the acid attack.

The solubilised Fe, Al and $P_2O_5$ values in the phosphate rich leach solution can readily be determined by standard analytical techniques and need not be described here.

After treatment with the nitric acid, a major proportion of the Fe and Al compounds in the rock will remain undissolved and may be removed from the phosphate rich leach solution using standard separation techniques such as filtration, decantation, centrifugation and so on. Acid attack will continue during the separation stage unless steps such as cooling are taken to slow down the attack. Thus if the separation stage takes a long time, steps to slow down the rate of attack must be taken or the period spent in the attack stage shortened accordingly.

As pointed out above, it is an essential feature of the present invention that the phosphate rock contains aluminium and/or iron compounds and these are in the form of the non-hydrated metal oxides which are not rapidly dissolved by the attacking acid. In certain naturally occurring phosphate rocks, especially those of igneous origin, the iron and/or aluminium compounds are present in the desired form - i.e. in the form of the nonhydrated metal oxides. However, in many phosphate rocks the iron and/or aluminium are present in the form of hydrated oxides, hydroxides, sulphides, carbonates, etc., and it is, accordingly often necessary to treat the phosphate rock so as to convert the metal compounds usually to $Fe_2O_3$ and $Al_2O_3$. This may conveniently be achieved by calcination of the rock, before treatment with the nitric acid, suitably at a temperature of from 300° to 1200° C and preferably at a temperature of from 700° to 1100° C and in the presence of air. For such calcination, the rock will preferably be in roughly-ground form if part of the iron is not in the trivalent form, but otherwise grinding is unnecessary. The period of treatment should be such as to convert as much as possible and at least a major proportion of the metal compounds to the desired non-hydrated oxides $R_2O_3$. In this latter connection it should be noted that it is not necessary that all the metal contaminants be converted to the desired oxides since the process will tolerate the dissolution, in the attacking acid, of some of the metal values. Examples of phosphate rocks containing iron contaminants which usually require such heat treatment include rocks containing combinations of fluoroapatite with siderite, goethite, lepidocrocite, limonite and pyrite. Examples of aluminium-containing phosphate rocks which will generally require such heat treatment include rocks containing combinations of fluoroapatite with bauxite, laterite, boehmite, diaspore and gibbsite. Examples of phosphate rocks which sometimes do not require heat treatment include rocks containing combinations of fluoroapatite with iron and/or aluminium impurities which are substantially in the form haematite ($Fe_2O_3$) or corundum ($Al_2O_3$). As far as magnetite ($Fe_3O_4$) containing rocks are concerned, calcination may be desirable in some cases for example when the content is high, e.g. above about 10%.

The treatment of the phosphate rock with the nitric acid will generally be carried out under conventional conditions for reacting phosphate rocks with nitric acid, for example at a temperature of from 50° to 65° C using nitric acid of 53 to 65 percent by weight strength. As is known in the art, the material will generally be in a finely divided state for the leaching, e.g. having particle size of less than 0,5 mm. However, the degree of fineness will depend on the type of rock being attacked. The product obtained from the attack of the nitric acid on the phosphate rock will generally comprise phosphoric acid, excess nitric acid, calcium nitrate, some hydrofluoric acid, a little solubilised Fe and/or Al and undissolved Fe and/or Al compounds. As discussed above, the undissolved matter may be removed from the reaction mixture by conventional means and the reaction solution will then be worked up in a conventional manner to give the desired product. Generally speaking, the further working up of the phosphoric acid/nitric acid/calcium nitrate solution will involve separation of some or all of the calcium nitrate from the acid, e.g. by crystallisation and filtration as described in "Separation of calcium nitrate by crystallisation", The Chemistry and Technology of Fertilizers, p. 325, V. Sauchelli. Alternatively, the separation may be achieved by a solvent extraction process using, for example, diisopropyl ether or isobutanol as extractant. The resulting phosphoric/nitric acid mixture obtained by extraction can then be ammoniated and, if required, the monoammonium phosphate produced separated from the ammonium nitrate by fractional crystallisation. clearly, however, the product may be worked up in other conventional ways to provide, for example, an NP or NPK fertiliser or a phosphate salt and ammonium nitrate.

In order that the invention may be well understood the following examples are given by way of illustration only. Unless otherwise indicated parts are parts by weight and degrees are degrees centigrade.

EXAMPLE I 200 parts by weight of 54% $HNO_3$ nitric acid was introduced at 50° C into a stainless steel reaction vessel fitted with means of stirring. The reaction vessel was equipped with submerged compressed air jets and a water jacket so that cooling or heating could be effected as necessary. 100 parts of the rock described in Table I:

TABLE I

| ROCK CHEMICAL ANALYSIS | |
|---|---|
| | % by weight |
| $P_2O_5$ | 30.00 |
| $Fe_2O_3$ | 17.97 |
| $SiO_2$ | 3.82 |
| CaO | 42.34 |
| $CO_2$ | 0.32 |
| $Al_2O_3$ | 1.79 |
| MgO | 0.15 |
| F | 1.94 |
| S | 0.03 |
| Cl | 0.01 |
| $H_2O$ 110° C | 0.22 |

| ROCK SIZE ANALYSIS | |
|---|---|
| Size (Tyler Scale) | % by weight |
| +20 mesh | 42.5 |
| −20 + 48 mesh | 22.2 |
| −48 + 65 mesh | 3.3 |
| −65 + 150 mesh | 13.2 |
| −150 mesh | 18.8 | was added steadily over a period of 20 minutes and the temperature in the vessel was maintained at 55°–65° for a further 40 minutes. Routine analytical testing of the vessel contents then showed that 93% of the $P_2O_5$ and 5% of the iron in the rock had dissolved. The temperature of the reaction mixture was reduced immediately and the insoluble material (mainly haematite) was separated by settling and filtration. The insoluble material was washed with hot water and the washings added to the filtrate to give 320 parts of solution containing $H_3PO_4$ 12½%, $Ca(NO_3)_2$ 37%, $HNO_3$ 4%, F 0.6% and $Fe_2O_3$ 0.3%.

This solution was neutralised with ammonia to pH 5.5 and granulated by being sprayed onto a bed of recycled granules followed by drying. The final product contained 19% N, 14% $P_2O_5$ mainly present as calcium phosphate and ammonium nitrate with some calcium nitrate and a little iron phosphate. The granular material was a good fertiliser because the nitrogen content is soluble in water and the phosphate is largely soluble in ammonium citrate solution.

EXAMPLE II

A number of mineral compounds of iron and aluminium were examined before and after calcination at a range of temperatures (450°, 700° and 1050° C). The examination included studies of X-Ray diffraction patterns to confirm that the starting minerals were of satisfactory purity and to study the rate of formation of ignition products: this was to provide a preliminary guide to what products were being formed and at what temperature. Thereafter the rates of solubility of the minerals, before and after calcination, were studied at 60° C in (i) 54% $HNO_3$ and in (ii) an acid mixture containing $HNO_3$, $H_3PO_4$ and HF chosen to represent the composition of the attack acid when the reaction with phosphate rock is about half-way to completion. Reaction times of ¼, 1, 2 and 48 hours were given, but most of the work was done with ½ hour.

Samples of siderite, magnetite, bauxite, gibbsite, goethite, limonite, haematite and corundum were studied in this way and the findings were as follows:- i. The X-Ray examinations showed that all the iron-containing minerals were substantially converted to haematite by calcination at 700°. The aluminium-containing minerals were occasionally converted substantially to corundum at 700° but 1050° was usually necessary.

ii. The rate of solubility of any particular mineral, calcined or uncalcined, was higher in the acid mixture than in nitric acid alone - usually by a factor of 2 to 10 after 30 minutes attack.

iii. The rate of solubility usually decreased as calcination time or temperature increased and as X-Ray examination had showed the proportion of $Fe_2O_3$ or $Al_2O_3$ in the mineral had increased.

Examples of the effect of calcination on the rate of solubility of magnetite and siderite now follow. In each case where calcination was done the time was 30 minutes at the temperature indicated and the mixed acid was used for 30 minutes at 60°. Solution data for uncalcined haematite are included for comparison purposes.

| Temperature of calcination | Percentage dissolved |
|---|---|
| MAGNETITE | |
| Uncalcined | 5.7 |
| 700° | 2.4 |
| Haematite, uncalcined | 2.4 |
| SIDERITE | |
| Uncalcined | > 50 |
| 450° | > 50 |
| 700° | 3.0 |
| Haematite, uncalcined | 2.4 |

From these data, it can be seen that a phosphate rock containing magnetite in an amount of about 10% or less does not generally require calcination in the process of the invention. However above this level calcination is usually necessary to obtain good results. A phosphate rock containing siderite in excess of 5% calculated as $Fe_2O_3$ must only be used after calcination at about 700° or higher.

I claim:

1. A method of solubilizing phosphate values in a phosphate rock which contains metal values selected from iron and aluminum substantially in the form of one or more of the oxides $Fe_2O_3$, $Fe_3O_4$ and $Al_2O_3$, hydrated oxides, hydroxides, sulfides or carbonates and in an amount greater than 3 percent by weight calculated as $R_2O_3$, wherein R is Al plus Fe, which comprises
   a. if the iron and alumina are not in oxide form, or iron is present as $Fe_3O_4$ in an amount greater than 10 percent, converting them by oxidative calcination at a temperature of 700° C. to 1100° C. to $R_2O_3$ oxide form and
   b. attacking the rock with a nitric acid leach solution of weight concentration of $HNO_3$ of 53 to 65 percent and in an amount in excess of that necessary to convert all the calcium in the rock to calcium nitrate and at a temperature of 40° C. to 75° C. for a time up to 2 hours to produce a phosphate rich leach solution containing at least 90 percent of the $P_2O_5$ values of the rock and no more than 10 parts by weight of Fe and Al in solution calculated as $R_2O_3$ per 100 parts by weight $P_2O_5$ in solution.

2. A method according to claim 1 wherein the acid attack is stopped whilst the phosphate rich leach solution contains no more than 5 parts by weight Fe and Al in solution calculated as $R_2O_3$ per 100 parts by weight $P_2O_5$ in solution.

3. A method according to claim 1 wherein the metal values selected from iron and aluminium are present in the rock in an amount in the range 5 to 25 percent by weight calculated as $R_2O_3$.

4. A method according to claim 1 wherein iron present in the rock is in the form of $Fe_2O_3$ and aluminum present in the rock is in the form of $Al_2O_3$.

5. A method according to claim 1 wherein the temperature is maintained in the range 40 to 75° C. during the acid attack.

* * * * *